Patented May 31, 1932

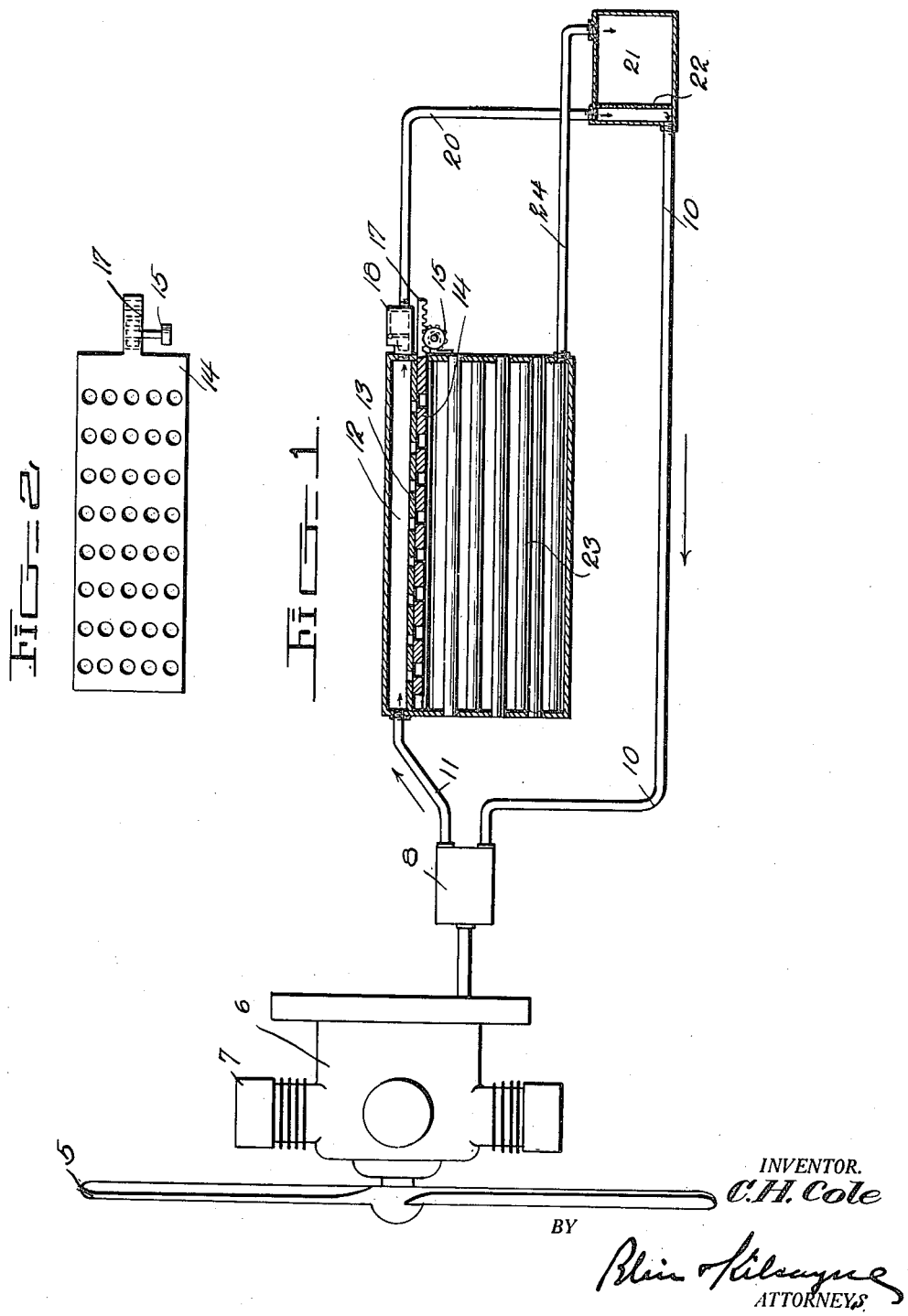

1,860,731

UNITED STATES PATENT OFFICE

CLARENCE H. COLE, OF WASHINGTON, DISTRICT OF COLUMBIA

LUBRICATING SYSTEM

Application filed April 5, 1930. Serial No. 441,960.

This invention relates to lubricating systems for aircraft and more particularly to the means for controlling the temperature of the lubricating oil.

As is well known to those familiar with the art, lubricating oil used in aircraft, especially in cold weather, is of a very high viscosity; in fact, it has substantially the consistency of molasses and it is very difficult to pump the same through the lubricating system. Very often in cold weather this thick oil fails to properly lubricate the engine during the warming up period and frequently bearings or other parts are burned out or seriously damaged due to improper lubrication during this period. Various means have been provided for heating the oil or maintaining the same at such temperature as to produce the desired viscosity, but these have either been expensive or unreliable. Furthermore, after the engine has warmed up to a considerable extent then unless this auxiliary heating means is disconnected or turned off, serious consequences may result from overheating the oil.

The present invention is, therefore, directed to a semi-automatic means for quickly warming the oil so as to produce the desired viscosity and eliminate as much as possible the danger of burned bearings due to the feeding of thick, cold oil to the relatively moving parts.

A further object is to provide an apparatus of the above general character of simple, compact construction which may be easily and quickly applied to aircraft engines especially and connected with the present parts of standard construction with the least amount of trouble and expense.

A further object is to provide an apparatus of the above character which will quickly heat the oil to its desired viscosity and as soon as this point is reached automatically prevent further heating of the oil or to cause reduction of the temperature thereof as may be necessary in order that the oil may be fed to the engine at its most efficient temperature and viscosity.

A further object is to provide an apparatus of the last above mentioned character in which the degree of viscosity and temperature of the oil may be adjusted as desired.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modification in structure and relation contemplated by this invention, drawings depicting a preferred form of the invention have been annexed as a part of this disclosure, and in such drawings like characters of reference denote corresponding parts throughout all of the views, in which—

Fig. 1 is a general diagrammatic view showing such parts of the complete system as is necessary to fully understand the invention and its application; and Fig. 2 is a detailed view of one of the parts.

Referring now to the drawings in detail, and more particularly to Fig. 1, 5 indicates diagrammatically the propeller at the front end of a motor 6, which is provided with a plurality of cylinders 7 for driving the propeller. These parts are merely shown diagrammatically as applied to an aeroplane, but obviously the invention is equally applicable to other installations.

Adjacent the crank case of the motor is a pump 8 which is adapted to draw in the lubricating oil through the pipe 10, pass the same through the engine and thence out through the pipe 11 and complete the circuit back to the tank. As the oil issues from the pipe 11, it passes into a rectangular chamber 12, the intermediate part of which is provided with a perforated member or plate 13 shown in detail in Fig. 2, immediately beneath which is a second or cooperating plate 14, also having openings adapted to be brought into and out of registry with the openings in the plate 10

13 as by turning a thumb screw 15 or the like having a pinion meshing with a rack 17 on the movable plate. In other words, by turning the pinion or thumb screw 15 the relative size of the registering openings may be changed or closed according to the temperature of the oil desired.

If the oil is cold and of a very thick consistency then it will pass over and from the screens or perforated plates 13 and 14, out past a weighted check valve 18 to pipe 20, down through which it passes to a tank 21. This inlet port is separated from the body of the tank by means of a perforated baffle 22 for the purpose of preventing oil mingling at once with the cold oil in the tank. It will be noted that the pipe 10 communicates with the space between the end of the tank 21 and the baffle, and thus this partially warmed oil or the oil which has been heated by reason of its having passed through the motor is immediately drawn upon by means of a pump 8 to be again forced through the motor. In that way the same oil is used over and over again until it becomes heated to a temperature sufficient to change its consistency or viscosity whereupon it will pass down through the perforations in the plates 13 and 14 and over the radiating pipes 23 and out through the outlet 24 to the tank 21. Of course as the oil becomes warm and its viscosity changes only part of the oil will pass through these perforations 13 and part of the oil will pass down through the pipe 20, but any deficiency of the supply required passing through the pipe 10 will be made up by the oil in the tank 21. In this manner, there is always assured a constant supply of oil to the motor and its desired consistency will be most rapidly attained.

In extremely warm weather it may be desirable to have the oil as cool as possible, relatively speaking, of course, and under such circumstances the adjusting device 15—17 is so positioned as to permit a maximum quantity of oil to pass through the registering perforations into the radiator 23. At other times, however, when the weather is extremely cold, it will probably be desirable to reduce the size of these openings almost to a minimum. In this manner, the consistency or viscosity of the oil may be readily controlled according to the temperature, either upon the ground or at high altitude and maintained at the desired viscosity during relatively long flights. The principal purpose, however, is to heat quickly the oil to such consistency as to insure complete lubrication of all moving parts during the warming up process prior to actual flight.

While the present invention has been described particularly with relation to its use upon aircraft, it will, of course, be understood that it is equally applicable to other installations including motor vehicles, motor boats, etc.

Also while the perforated plates have openings adapted to be brought into or out of registry as herein generally described, it is, of course, to be understood that these plates may be of curved cross section even to the extent of being tubing, and the following claims are to be interpreted as being directed to the use of a screen, perforated sheet, or tube in the oiling system of an engine whereby the change of flow of oil through different channels according to variations in temperature is most easily and quickly accomplished.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In lubricating systems for gas engines and the like comprising a tank, a pump, pipes leading to and from the pump and tank, a radiator in the return pipe, and means for by-passing the oil around the radiator back to the tank while its viscosity is high, said means comprising a perforated member over which the oil is adapted to flow when its viscosity is high.

2. In lubricating systems for gas engines and the like comprising a tank, a pump, pipes leading to and from the pump and tank, a radiator in the return pipe, and means for by-passing the oil around the radiator back to the tank while its viscosity is high, said means comprising a perforated member and means for varying the size of the perforations whereby the lubricant will pass either over or through the perforations depending upon its viscosity.

3. In combination with the gas engines of an airplane or the like, an oil tank, a pump, a circuit including a conduit connecting the tank therewith, a radiator in the return pipe, and perforated member onto which the oil from the pump is discharged, whereby the oil may pass through the perforations to the radiator if its consistency is low or directly back to the pipe leading from the tank to the pump if its viscosity is high.

4. In combination with a gas engine having an oil tank, pipes leading from the tank to the engine and from the engine to the tank, an oil radiator in the return pipe, a perforated member above the radiator onto which the oil from the engine is discharged, said oil passing through the perforations to the radiator if its viscosity is low, and passing over the plate back to the pipe leading from the oil tank to the engine if the viscosity is high.

5. In combination with a gas engine having an oil tank, pipes leading from the tank to the engine and from the engine to the tank, an oil radiator in the return pipe, a perforated member above the radiator onto which the oil from the engine is discharged, said oil passing through the perforations to the radiator if its viscosity is low, and passing over the plate back to the pipe leading from the oil tank to the engine if the viscosity is high, and means for regulating the size of the openings in said perforated plate.

Signed at Washington, District of Columbia, this 31st day of March, 1930.

CLARENCE H. COLE.